United States Patent
Bell

(10) Patent No.: US 6,405,412 B1
(45) Date of Patent: Jun. 18, 2002

(54) SEATBELT BUCKLE TONGUE

(75) Inventor: John Bell, Carlisle (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/583,357

(22) Filed: May 31, 2000

(30) Foreign Application Priority Data

Feb. 16, 2000 (GB) .............................................. 0003605

(51) Int. Cl.⁷ .............................................. A44B 11/04
(52) U.S. Cl. ........................ 24/265 BC; 24/198; 24/323
(58) Field of Search ............................... 24/198, 163 R, 24/200, 197, 265 BC, 309–313, 323; 297/468, 483; 280/801.1, 808

(56) References Cited

U.S. PATENT DOCUMENTS

| | | | |
|---|---|---|---|
| 4,023,826 A | 5/1977 | Kokubo et al. | ............. 280/747 |
| 5,023,980 A | * 6/1991 | Thomas | |
| 5,417,455 A | * 5/1995 | Drinane et al. | |
| 5,870,816 A | 2/1999 | McFalls et al. | ................ 29/434 |
| 5,984,358 A | 11/1999 | Mar et al. | .................... 280/808 |

FOREIGN PATENT DOCUMENTS

| GB | 11136520 | 5/1968 |
|---|---|---|
| WO | 8303767 | 11/1983 |

* cited by examiner

Primary Examiner—James R. Brittain
(74) Attorney, Agent, or Firm—Jarett Rieger; Lonnie Drayer

(57) ABSTRACT

A seatbelt buckle tongue has a buckling part and an aperture through which seatbelt webbing passes. The extent of sliding of the tongue on the webbing is limited by at least one protrusion provided on the inside of the aperture in the tongue. A protrusion may be round, square or formed of a line of a plurality of buttons dimensioned and arranged to apply pressure to the webbing passing through the tongue and resist sliding of the tongue on the webbing.

5 Claims, 2 Drawing Sheets

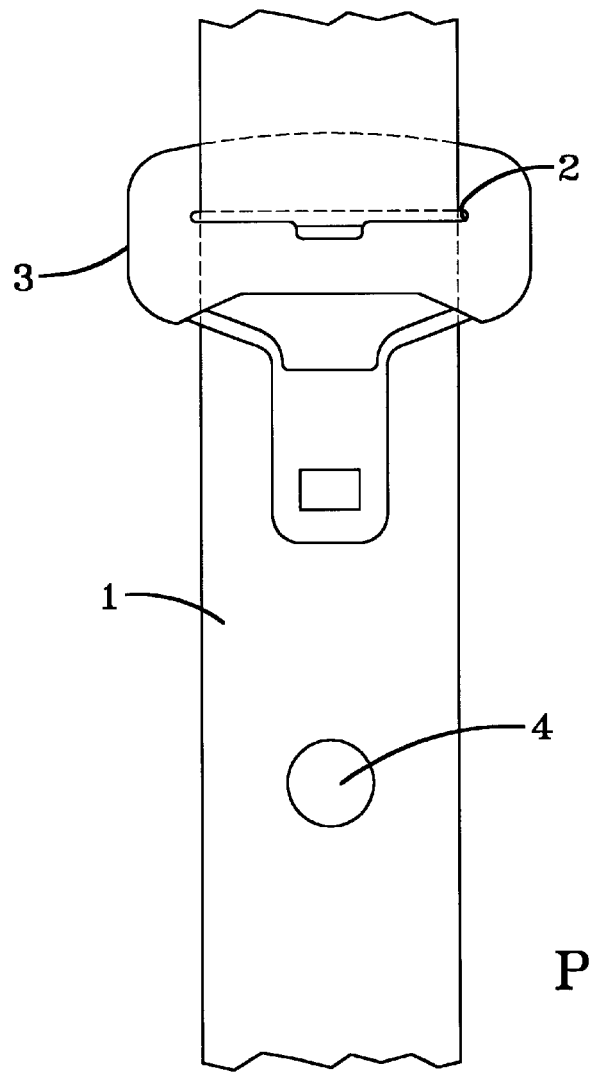
FIG-1
PRIOR ART
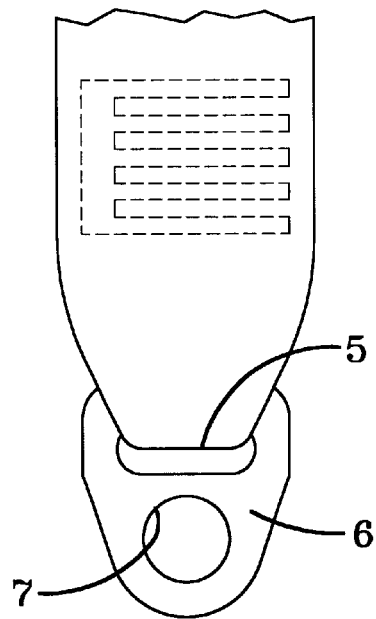

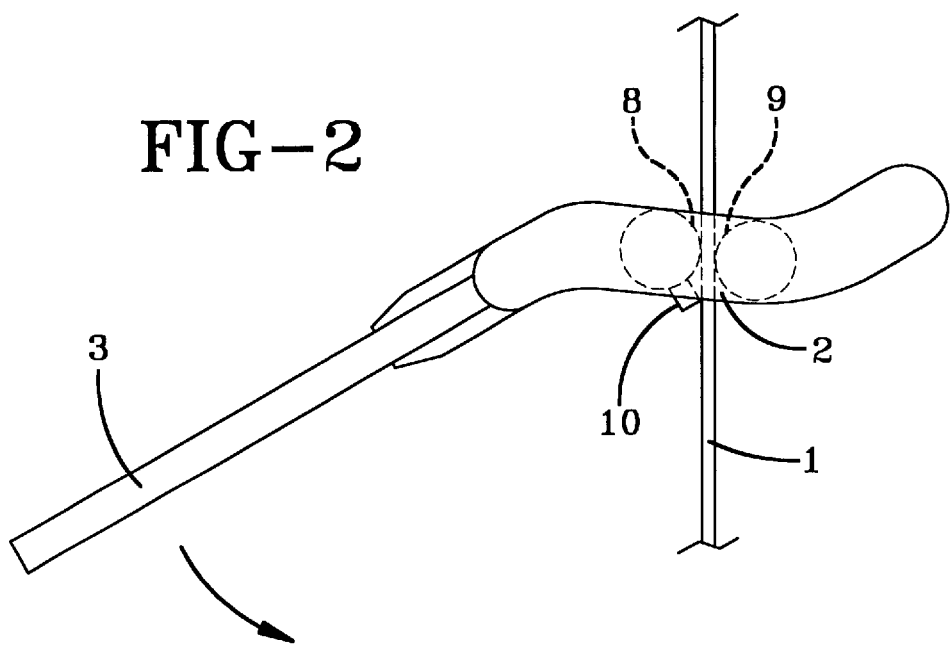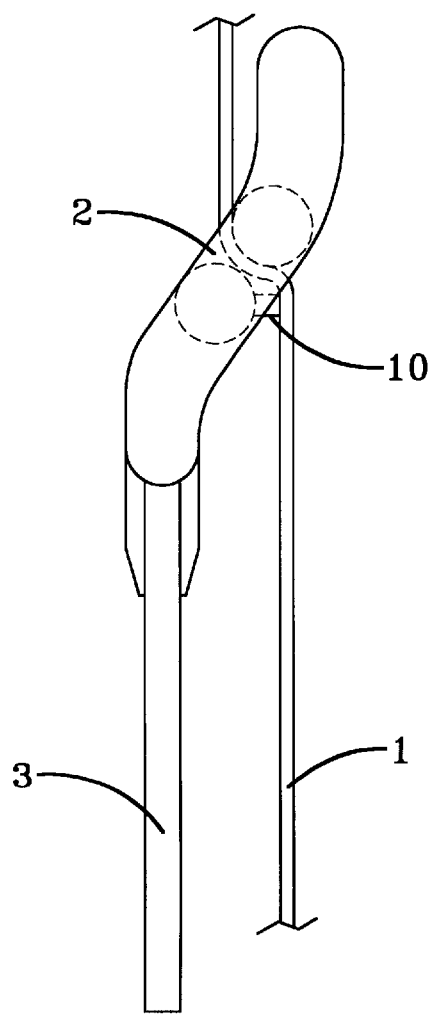

SEATBELT BUCKLE TONGUE

FIELD OF INVENTION

The present invention relates to a tongue for a seatbelt buckle.

BACKGROUND OF THE INVENTION

Seatbelt systems for vehicles usually comprise a length of seatbelt webbing wound on a rotatable spool that is part of a retractor controlling payout of the webbing. One end of the webbing is fixed to the retractor, which is mounted to a load bearing part of the vehicle such as a side pillar. The webbing extends from the retractor vertically up the side pillar to a webbing loop known as a D-ring at the vehicle occupant's shoulder. The webbing then passes diagonally across the vehicle occupant's torso to a buckling mechanism attached to the floor of the vehicle between the seats. The webbing then passes back across the vehicle occupant's lap where the other end of the webbing is fixed to the floor of the vehicle adjacent the other side of the seat.

The buckling mechanism comprises a metal tongue releasably engaging a buckle. The webbing is looped through an aperture or slot in the tongue. When the seatbelt is unfastened, the webbing is re-wound onto the retractor and the tongue is pulled away form the buckle. In this stored position the tongue slides on the webbing and can fall to the floor of the vehicle, which is inconvenient for the occupant. To prevent this, webbing stops have previously been incorporated into the webbing in the form of rubber or plastic attachments molded or otherwise applied to the webbing, to resist the tongue sliding more than a predetermined distance down the webbing in the stored position. However such attachments in the webbing can interfere with the correct fitting of child seats in the vehicle and prevent the free run of webbing through the tongue slot when no vehicle occupant is present. This means that the three point system will not necessarily pass the latest safety regulations which require that a minimum tension be attainable in the lap portion of the belt by external application of tension in the diagonal section, even when no vehicle occupant is restrained in the seat.

SUMMARY OF THE INVENTION

The present invention provides an improved webbing stop that does not interfere with the characteristics of the seatbelt system such as to reduce the tension achievable in the lap portion or prevent the system being safely used with child seats.

According to the present invention, there is provided a seatbelt buckle tongue for a vehicle safety restraint system. The tongue comprises a buckling part and an aperture through which seatbelt webbing passes, wherein the extent of sliding of the tongue on the webbing is limited by one or more protrusions provided on the inside of the aperture in the tongue.

Preferably the protrusion is dimensioned and arranged to apply pressure to the webbing passing through the tongue to resist a sliding movement of the tongue on the webbing.

According to a preferred embodiment of the invention, the aperture in the tongue through which the webbing passes has two convex edges and the protrusion is positioned on one of the convex edges of the aperture. The protrusion is positioned such that it only protrudes into the webbing path when the tongue is in the stored, vertical, position. Furthermore, the protrusion is positioned such that the weight of the tongue causes sufficient friction between the webbing and the button to hold the tongue in position on the webbing and prevent it sliding downwardly.

BRIEF DESCRIPTION OF THE DRAWINGS

For a better understanding of the present invention and to show how the same may be carried into effect, reference will now be made, by way of example, the accompanying drawings, in which:

FIG. 1 is a plan view of a prior art seatbelt tongue and webbing with a known webbing stop;

FIG. 2 cross-sectional view of a seatbelt tongue according to the present invention with the tongue at an angle with the line of the webbing; and FIG. 3 is the same view as in FIG. 2 but with the tongue in the parked position, i.e. generally parallel to the webbing.

DETAILED DESCRIPTION OF THE INVENTION

In the figures, a length of seatbelt webbing 1 is shown passing through an aperture 2 in a seatbelt buckle tongue 3, so that the tongue 3 is slidably mounted on the webbing.

In the known prior art arrangement of FIG. 1 a tongue stop 4 is molded into the webbing 1 at a predetermined distance form an end 5 of the webbing. The tongue stop 4 catches in the aperture 2 of the tongue 3 and resists further sliding movement of the tongue down the webbing. The end 5 of the webbing 1 has a mounting bracket 6 sewn into it. This bracket is for mounting the webbing 1 to a load bearing part of a vehicle. For example a bolt (not shown) may pass through the hole 7 in the bracket 6 and be secured to the floor of the vehicle.

The tongue stop 4 prevents the tongue falling to the floor of the vehicle and thus makes it easier for a vehicle occupant to pick up the seatbelt buckle tongue when engaging the safety restraint. However, this tongue stop 4 applies resistance to the movement of the tongue past that part of the webbing regardless of the orientation of the tongue in relation to the webbing. Thus the tongue stop can interfere with the correct fitting of a child safety seat and can make the restraint less likely to pass the stringent regulations set by the regulatory bodies.

An improved arrangement according to the present invention is shown in FIGS. 2 and 3. The aperture 2 in the tongue 3 is formed by two facing convex surfaces 8, 9. An improved tongue stop is formed of a protrusion or button 10 attached to one of the convex surfaces in such a position that when the webbing and tongue are generally parallel to each other the button 10 projects into the path of the webbing 1. The friction between the button 10 and the webbing 1 is dependent on the mass of the tongue 3 and the angle of orientation of the tongue relative to the webbing.

In FIG. 2 the tongue 3 is shown generally in a position indicative of use of the tongue 3, i.e. in engagement with the buckle. In this position there is an acute angle between the line of the webbing and the line of the tongue whereas FIG. 3 shows the parked position, wherein the tongue 3 is generally parallel to the webbing 1 when the tongue is not engaging the buckle.

However, in FIG. 3 with the tongue 3 in the parked position it is generally parallel to the line of webbing 1. In this orientation of the tongue 3 the button 10 protrudes substantially perpendicularly compared to the path of the webbing and pushes the webbing 1 further out of its vertical path. Thus the friction between the webbing and the tongue is increased providing resistance to sliding of the tongue 3 along the webbing 1.

The protrusion 10 may take many forms. It may be a relatively simple round or square button or it may be formed of a plurality of protruberances arranged in a line extending across the width of the webbing, or as a continuous protruberance across the width of the webbing. A line of two square profile buttons is shown as an example in FIG. 3. The button(s) may be formed as part of the tongue molding or casting, or as an extra part glued or welded onto the tongue 3. The button 10 may be formed of rubber or plastics material or any other suitable material. The exact form, material and dimensions can be chosen to suit the application concerned, i.e. to suit the composition and width of the webbing and the construction of the tongue together with the vehicle into which it is fitted.

It should be understood by those skilled in the art that structural modifications can be made without departing from the scope of the invention. Accordingly, reference should be made primarily to the accompanying claims to determine the scope of the invention.

I claim:

1. A seatbelt buckle tongue comprising a buckling part adapted for cooperation with a buckle and a seatbelt webbing connecting part consisting of one aperture therethrough bordered by two opposing convex surfaces for receiving seatbelt webbing, the extent of sliding of the tongue on the seatbelt webbing is limited by at least one protrusion provided on the inside of the aperture, the seatbelt webbing passes through one aperture, the protrusion is positioned on one side of the aperture and extends generally perpendicular to the tongue.

2. The seatbelt buckle tongue of claim 1 wherein the protrusion is positioned so that the weight of the tongue itself causes sufficient friction between the webbing and the protrusion to hold the tongue in position on the webbing and prevent it sliding downwardly, in the park position.

3. The seatbelt buckle tongue of claim 1 wherein the protrusion has a square profile.

4. The seatbelt buckle tongue of claim 1 wherein the protrusion is molded or cast with the tongue.

5. The seatbelt buckle tongue of claim 1 wherein the protrusion is formed separately from the tongue and is attached to the aperture.

* * * * *